US006299808B1

(12) United States Patent
Mork et al.

(10) Patent No.: US 6,299,808 B1
(45) Date of Patent: Oct. 9, 2001

(54) CONTINUOUS PROCESS FOR POLYMERIZING, CURING AND DRYING HIGH INTERNAL PHASE EMULSIONS

(75) Inventors: Steven W. Mork; Bruce A. Malone, both of Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/586,908

(22) Filed: Jun. 5, 2000

(51) Int. Cl.⁷ .............................. B29D 7/00; B29C 62/20; B29C 67/00; C08J 9/28
(52) U.S. Cl. .................. 264/46.1; 264/45.9; 264/46.2; 264/46.4; 521/64; 521/79
(58) Field of Search ................................. 264/45.9, 46.1, 264/46.2, 46.4; 521/64, 79

(56) References Cited

U.S. PATENT DOCUMENTS

| | | | |
|---|---|---|---|
| 3,565,817 | 2/1971 | Lissant | 252/312 |
| 3,946,994 | 3/1976 | Mertz et al. | 259/7 |
| 4,018,426 | 4/1977 | Mertz et al. | 259/7 |
| 4,522,953 | 6/1985 | Barby et al. | 521/64 |
| 4,536,521 | 8/1985 | Haq | 521/146 |
| 4,788,225 | 11/1988 | Edwards et al. | 521/147 |
| 4,844,620 | 7/1989 | Lissant et al. | 366/136 |
| 5,147,345 | 9/1992 | Young et al. | 604/378 |
| 5,149,720 | 9/1992 | DesMarais et al. | 521/63 |
| 5,198,472 | 3/1993 | DesMarais et al. | 521/63 |
| 5,200,433 | 4/1993 | Beshouri | 521/64 |
| 5,210,104 | 5/1993 | Bass et al. | 521/64 |
| 5,250,576 | 10/1993 | Desmarais et al. | 521/63 |
| 5,260,345 | 11/1993 | DesMarais et al. | 521/148 |
| 5,268,224 | 12/1993 | Desmarais et al. | 428/286 |
| 5,318,554 | 6/1994 | Young et al. | 604/378 |
| 5,331,015 | 7/1994 | DesMarais et al. | 521/62 |
| 5,670,101 | 9/1997 | Nathoo et al. | 264/45.8 |
| 5,827,909 | 10/1998 | Desmarais | 523/346 |

Primary Examiner—Morton Foelak

(57) ABSTRACT

The invention comprises a fully continuous process for shaping a high internal phase emulsion (HIPE) with a polymerizable continuous phase into dry foam, comprising 1) providing a high internal phase emulsion (HIPE) comprising (a) at least 70 percent by volume of an eternal phase comprising one or more polymerizable monomer; (b) a surfactant in an amount effective to produce a high internal phase emulsion; and (c) an internal phase; 20 depositing the emulsion onto a lower moving support substrate; 3) leveling the emulsion to a desired thickness above the support substrate; 4) polymerizing the monomers by running the emulsion and the lower moving support substrate through a heating zone for a time sufficient to polymerize at least 75% of the monomer in the HIPE by the end of the heating zone; and 5) drying the polymerized HIPE in a drying zone for a time sufficient to produce a foam having greater than 50% of the internal phase removed.

48 Claims, 2 Drawing Sheets

CONTINUOUS PROCESS FOR POLYMERIZING, CURING AND DRYING HIGH INTERNAL PHASE EMULSIONS

BACKGROUND OF THE INVENTION

1. Field of the Invention

The invention relates to a continuous process for shaping, polymerizing, and optionally drying porous polymeric foam from water-in-oil high internal phase emulsions (HIPEs).

2. Description of the Prior Art

Water-in-oil emulsions are dispersions of discontinuous or discrete water particles commonly referred to as the "internal" aqueous phase in a continuous or "external" oil phase. Emulsions can contain as much and more than 70 volume percent internal phase. These are often referred to as high internal phase emulsions. The volume fraction of the internal aqueous phase in such emulsions can be as high as 90 percent and frequently is as high as 95 percent with some HIPEs being reported as high as 98 percent aqueous phase.

The use of high internal phase emulsions (HIPEs) in forming porous polymeric materials is well known and is described, for example, in Shell Oil Company (Shell) U.S. Pat. Nos. 5,210,104 and 5,200,433; Lever Brothers Company (Lever) U.S. Pat. Nos. 4,536,521 and 4,788,225; and The Procter & Gamble Company (P&G) U.S. Pat. Nos. 5,147,345; 5,331,015; 5,260,345; 5,268,224 and 5,318,554. In the described HIPEs, the external oil phase typically comprises a vinyl polymerizable monomer, such as 2-ethylhexyl acrylate and styrene, and a cross-linking monomer such as divinylbenzene. The internal aqueous phase typically comprises water, a radical initiator (if one is not already present in the oil phase) and an electrolyte. To form a stable emulsion, a surfactant is added to the oil phase prior to emulsification. Commonly used emulsion stabilizing surfactants include, for example, nonionic surfactants, such as sorbitan esters (e.g., sorbitan monooleate and sorbitan monolaurate). The resulting emulsion is then subjected to polymerization conditions which are sufficient to polymerize the monomers in the oil phase to form a porous polymer.

Ideally, one would like to produce polymerized HIPE foam in a continuous manner, thereby making efficient use of equipment space and volume while simplifying the production process. Continuous processes for the production of HIPE have been documented (see for example U.S. Pat. Nos. 3,565,817; 3,946,994; 4,018,426; 4,844,620; 5,149,720; 5,198,472; 5,250,576; and 5,827,909) however all of these patents fall short of a fully continuous process by not addressing how to continuously shape, polymerize, and dry the HIPE once prepared.

U.S. Pat. Nos. 3,565,817; 3,946,994; 4,018,426; and 4,844,620 disclose continuous processes for the production of high internal phase emulsions (HIPEs) but do not address shaping, polymerizing or drying the emulsion.

U.S. Pat. Nos. 5,149,720; 5,198,472; and 5,250,576, issued to Des Marais et al., as well as U.S. Pat. No. 5,827,909, issued to Des Marais disclose continuous processes for the production of polymerizable high internal phase emulsions (HIPEs). These patents teach that the HIPE, once prepared, can be polymerized by placing the HIPE emulsion in a suitable polymerization container and subjecting the emulsion therein to curing conditions. Therefore, the disclosed process, including HIPE preparation, shaping, polymerization, and drying is limited to a batch or semi-batch process.

A recent attempt to achieve a more complete continuous process is U.S. Pat. No. 5,670,101 ('101 patent), issued to Nazim et al., which discloses a process whereby a polymeric "tube" is filled with HIPE. The HIPE-filled tube is then spooled and polymerized. The primary disadvantage of the process disclosed in the '101 patent lies in the fact that it is actually a semi batch process rather than a continuous process. In the '101 process, tubes are filled with HIPE and then wrapped on a spool until the spool is full. The spool is then removed from the line for polymerization while another spool is wrapped. (see, for example, column 7 lines 39 ff.). The invention of U.S. Pat. No. 5,670,101 is more accurately described as a process of semi-continuously filling a plastic tube with a polymerizable HIPE. Further, the process of the '101 requires one to unwrap the polymerized foam from the spool, remove the bag from the HIPE and either discard the bag or re-implement at the beginning of the process.

Unfortunately, while the continuous production of HIPEs is known, current technology is limited to batch or semi-batch processes for shaping, polymerizing and drying the HIPE. It would be desirous to have a continuous process for shaping, polymerizing and drying polymerized HIPE foam so that the whole process of HIPE foam production could be continuous.

In contrast, the invention of the instant application is continuous in nature all the way through the drying of the final HIPE foam. Unlike prior art processes, the instant invention requires no interruption of the process from the making of the HIPE through the curing and drying process of the HIPE. The process of the instant invention overcomes the disadvantages of the prior art, since it does not require the HIPE to be placed in containers for polymerization and then removed again for drying and/or use; nor does the process of the instant invention require the HIPE to be place in bags which need to be wrapped, unwrapped and re-implemented or discarded. Rather, the invention of the application uses a continuous HIPE web to move the HIPE through the process.

SUMMARY OF THE INVENTION

The invention comprises a fully continuous process for shaping and polymerizing a high internal phase emulsion (HIPE). The process begins by providing a high internal phase emulsion (HIPE) comprising a) at least 70 percent by volume of an external phase comprising one or more polymerizable monomers, b) a surfactant in an amount effective to produce a high internal phase emulsion and c) an internal phase. The HIPE is then deposited onto a lower moving support substrate and is leveled to a desired thickness above the support substrate. The support then carries the emulsion through a heating zone for a time sufficient to polymerize at least 75% of the monomers in the HIPE. Finally, the polymerized HIPE is run through a drying zone for a time sufficient to remove greater than 50% of the internal phase from the final product.

The foams produced by the process of the invention can be useful as, for example, absorbent materials, thermally insulating materials, acoustically insulating materials, and filters.

DETAILED DESCRIPTION OF PREFERRED EMBODIMENT

Figure 1:
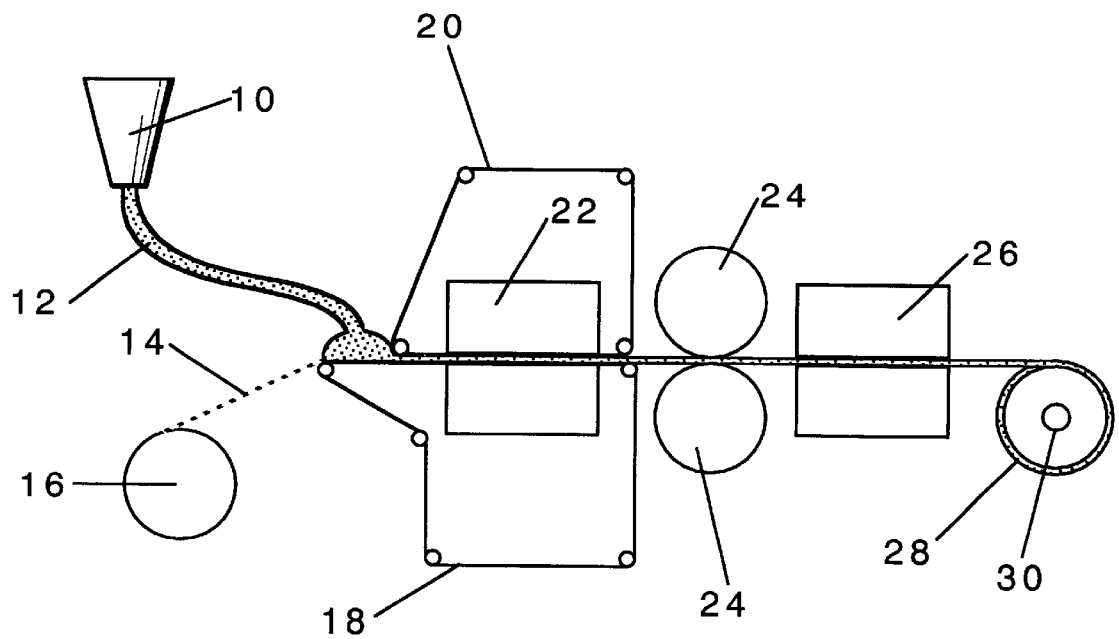
FIG. 1 is a schematic view of the invention comprising two lower moving support substrates, an upper moving substrate, an oven for the heating zone, a pair of nip rollers and an oven for the drying zone and a mandrel for rolling the final foam.

The invention comprises a fully continuous process for shaping and polymerizing a high internal phase emulsion (HIPE) comprising the steps of:
1) providing a high internal phase emulsion (HIPE) comprising:
   a) at least 70 percent by volume of an external phase comprising one or more polymerizable monomers,
   b) a surfactant in an amount effective to produce a high internal phase emulsion; and
   c) an internal phase
2) depositing the emulsion onto a lower moving support substrate;
3) leveling the emulsion to a desired thickness above the support substrate
4) polymerizing the monomers by running the emulsion and the lower moving support substrate through a heating zone for a time sufficient to polymerize at least 75% of the monomers in the HIPE by the end of the heating zone;
5) running the polymerized HIPE through a drying zone for a time sufficient to produce a foam having greater than 50% of the internal phase removed.

Methods for preparing water-in-oil emulsions are known in the art such as, for example, in U.S. Pat. Nos. 4,522,953 and 5,210,104, the disclosures of which are incorporated herein by reference, and these methods can be employed in the practice of the present invention. Methods for continuous flow HIPE preparation are also well established in the literature. See, for example, U.S. Pat. Nos. 3,565,817; 3,946,994; 4,018,426; 4,844,620; 5,149,720; 5,198,472; 5,250,576; and 5,827,909, the disclosures of which are incorporated herein by reference. According to these methods, a HIPE is formed by continuously introducing a certain type of monomer-containing oil phase and a certain type of electrolyte-containing water phase into a dynamic mixing zone at relatively low water to oil phase ratios. Flow rates are then steadily adjusted to increase the water to oil ratio of the streams fed to the dynamic mixing zone while subjecting the dynamic mixing zone contents to shear agitation which is sufficient to form a HIPE. The contents of the dynamic mixing zone are then fed to and through a static mixing zone.

While production of polymerizable HIPEs, including processes for the continuous production of HIPEs, are known, current technology is limited to batch or semi-batch processes for shaping, polymerizing and drying the HIPE.

In contrast to known processes, the claimed invention is continuous in nature all the way through the drying of the final HIPE foam. Unlike prior art processes, the instant invention requires no interruption of the process from the making of the HIPE through the steps of curing and drying. Advantageously, the process of the instant invention does not require the HIPE to be placed in containers for polymerization and then removed again for drying and/or use. Further, the claimed process does not require the HIPE to be secured in wrappings which need to be wrapped, unwrapped and re-implemented or discarded. Rather, the invention of the application uses a continuous HIPE web to move the HIPE through the process.

Polymerizable HIPEs suitable for use in the instant invention can be either water-in-oil or oil-in water, whereby "water" is not limited to an aqueous based phase but more generally the more polar of the two phases. Similarly, "oil" refers to the least polar of the two phases. The external phase comprises one or more monomers which can be polymerized to form a foam structure. The internal phase may also contain monomers or crosslinkable polymers, for example as described in U.S. Pat. No. 5,250,576.

Preferably, water-in-oil HIPEs are used wherein the water phase makes up at least 75%, more preferably at least 90%, still more preferably at least 95%, most preferably at least about 98% of the emulsion volume.

The oil phase preferably comprises vinyl polymerizable monomers. Vinyl polymerizable monomers which can be employed in the practice of the present invention are any polymerizable monomer having an ethylenic unsaturation that can be prepared as part of the oil phase of a HIPE. In general, the HIPEs are advantageously prepared from either or both (i) at least one monomer that tends to impart glass-like properties (glassy monomers) to the resulting porous polymeric material and (ii) at least one monomer that tends to impart rubber-like properties (rubbery monomers) to the resulting porous polymeric materials.

The glassy monomers are, for the purposes of the present invention, defined as monomeric materials which would produce homopolymers having a glass transition temperature above about 40.degree. C. Preferred glassy monomers include methacrylate-based monomers, such as, for example, methyl methacrylate, and styrene-based monomers, such as, for example, various monovinylidene aromatics such as styrene, o-methylstyrene, chloromethylstyrene, vinylethylbenzene and vinyl toluene. More preferred glassy monomers include styrene, o-methylstyrene, and chloromethylstyrene. The most preferred glassy monomer is styrene.

The rubbery monomers are, for the purposes of the present invention, defined as monomeric materials which would produce homopolymers having a glass transition temperature of about 40.degree. C. or lower. Preferred rubbery monomers include alkyl esters of ethylenically unsaturated acids ("acrylate esters" or "methacrylate" esters), such as 2-ethylhexyl acrylate, butyl acrylate, hexyl acrylate, butyl methacrylate, lauryl methacrylate, isodecyl methacrylate and mixtures thereof; vinyl aliphatic and alicyclic hydrocarbons such as butadiene; isoprene; and combinations of these comonomers. More preferred rubbery monomers include butyl acrylate, 2-ethylhexyl acrylate, butadiene, isoprene and combinations of these comonomers. The most preferred rubbery monomer is 2-ethylhexyl acrylate.

While the amount of the vinyl polymerizable monomers most advantageously employed depends on a variety of factors, such as the specific monomers, in general, the vinyl polymerizable monomers are used in an amount up to 100 weight percent of the total oil phase. Preferably, the vinyl polymerizable monomers are used in an amount greater than 10 weight percent, more preferably greater than about 25 weight percent, still more preferably greater than about 50 weight percent, even more preferably in an amount greater than 75 weight percent, based on the total oil phase.

Additionally, the HIPE may include a cross-linking monomer. Cross-linking monomers which can be employed in the practice of the present invention for preparing the HIPE include any multifunctional unsaturated monomers capable of reacting with the vinyl monomers. Preferably, though not required, the cross-linking monomer is soluble in the oil phase. Multifunctional unsaturated cross-linking monomers include, for example, divinylbenzene, ethylene glycol dimethacrylate, 3-butylene dimethacrylate, trimethylolpropane triacrylate and allyl methacrylate. The amount of cross-linking monomers most advantageously employed depends on a variety of factors, such as the specific monomers and the physical properties desired in the final foam. If used, the cross-linking monomer is typically used in an amount greater than 0, preferably greater than 5, and most preferably greater than about 10 weight percent based on the total oil phase. The cross-linking monomer can be used in an amount up to and including 100 weight percent.

Radical initiators are preferably employed in the practice of the present invention to increase the rate of polymerization of the HIPE. Initiators that can be used in this invention include water-soluble initiators such as, for example, potassium or sodium persulfate and various redox systems such as ammonium persulfate together with sodium metabisulfite and oil-soluble initiators, such as, for example, azobisisobutyronitrile (AIBN), benzoyl peroxide, methyl ethyl ketone peroxide and di-2-ethylhexyl-peroxydicarbonate and lauroyl peroxide. The initiator can be added to the aqueous phase or to the oil phase, depending on whether the initiator is water-soluble or oil-soluble. Combinations of water-soluble and oil-soluble initiators can also be used. The initiator should be present in an effective amount to polymerize the monomers. Typically, the initiator can be present in an amount of from about 0.005 to about 20 weight percent, preferably from about 0.1 to about 10 weight percent and most preferably from about 0.1 to about 5 weight percent, based on the total oil phase.

Optionally, the internal aqueous phase can include a water-soluble electrolyte for aiding the surfactant in forming a stable emulsion, controlling porosity of the foam and/or enhancing the hydrophilicity of the resulting polymeric foam material if left as a residual component of the foam material. Water-soluble electrolytes which can be employed in the practice of the present invention include inorganic salts (monovalent, divalent, trivalent or mixtures thereof), for example, alkali metal salts, alkaline earth metal salts and heavy metal salts such as halides, sulfates, carbonates, phosphates and mixtures thereof. Such electrolytes include, for example, sodium chloride, sodium sulfate, potassium chloride, potassium sulfate, lithium chloride, magnesium chloride, calcium chloride, magnesium sulfate, aluminum chloride and mixtures thereof. Mono- or divalent salts with monovalent anions, such as halides, are preferred. While the amount of electrolytes most advantageously employed depends on a variety of factors, such as the specific compound, the desired porosity of the foam and the surfactant employed, in general, the electrolytes can be employed up to about 10, more preferably up to about 5 and most preferably up to about 1 weight percent, based on the total aqueous mixture.

Polymeric electrolytes, such as sodium polyacrylate, can also be included in the aqueous phase if desired. Often, polymeric electrolytes can be used to increase the aqueous fluid retention in the final foam as described, for example in U.S. Pat. No. 5,900,437, the disclosure of which is incorporated herein by reference.

The internal aqueous phase can additionally comprise a non-electrolyte hydrophilizing component, such as, for example, glycerin, which can be left in the foam to enhance hydrophilicity as long as the HIPE can still be prepared and polymerized into a foam.

The HIPE is generally stabilized by the inclusion of a HIPE-stabilizing surfactant. Surfactants which can be employed in the practice of the present invention for preparing water-in-oil high internal phase emulsions include nonionic surfactants, such as, for example, sorbitan esters, including sorbitan monooleate and sorbitan monolaurate; glycerol esters, such as glycerol monooleate; diglycerol monoleate; PEG 200 dioleate, partial fatty acid esters of polyglycerol; cationic surfactants, such as ammonium salts; and anionic surfactants, such as certain organic sulfate and sulfonate compounds. Also suitable are nonionic, anionic, and cationic polymerizable surfactants such as those described in U.S. Pat. No. 5,977,194, the disclosure of which is incorporated herein by reference. Such surfactants include non-ionic and cationic surfactants having polymerizable vinyl groups and surfactants capable of undergoing a graft reaction (graftable surfactants) at the conditions of polymerization. Preferred are block copolymer surfactants comprising one or more poly(butylene oxide) block and one or more poly(ethylene oxide) block. Also suitable are polymerizable and non-polymerizable poly(butylene oxide/ethylene oxide) sulfate-based surfactants.

The amount of surfactant used must be such that a water-in-oil high internal phase emulsion will form. Generally, the surfactant need be present in an amount greater than 0, preferably greater than about 0.1 percent by weight of the oil phase. Generally, the surfactant is used in an amount less than about 25, preferably less than 15, more preferably less than about 10, most preferably less than about 5 percent by weight, based on the oil phase.

According to the instant invention, the polymerizable HIPE is deposited from an emulsifier onto the surface of a lower moving support substrate. Deposition can be accomplished any number of ways including, for example, by extruding the HIPE through a tube that shuttles back and forth across the lower moving support substrate in the plane of the lower moving support substrate but perpendicular to the direction the lower moving support substrate is moving. The primary role of the lower moving support substrate is to retain continuity of the HIPE as it is transported into the heating zone for polymerization. The lower moving support substrate can be, for example, a Teflon-coated fiberglass webbed conveyor belt. Such a conveyor belt can run through the whole process of the shaping, polymerizing and drying process or it can be included in only a portion of the process.

Alternatively, the conveyor can be such that it has 3-dimensional structure to which the HIPE is molded so as to define the HIPE into a web having non-planar 3-dimensional shape. For example, the conveyor can have regularly (or irregularly) placed dimples that become filled with HIPE such that the final foam will have nipples on its surface. Other examples include a conveyor with embossed or depressed patterns or designs including geometric shapes, insignia, and logos. Similarly, the conveyor can comprise a series of repeating 3-dimensional molds that are filled with HIPE to produce multiple articles that are either connected or not.

Alternatively, the lower moving support substrate can comprise a webbing that is intended to be incorporated onto or into the final foam. For example, the HIPE can be deposited onto a nonwoven material such as a spunbond polypropylene or polyester or a polypropylene or polyester mesh material. Additional carrier substrates include materials such as cotton, rayon, nylon, or wood pulp. The primary requirement is a porous structure such that water can permeate through the substrate in the drying operation. An additional substrate could be a perforated film such that the viscous emulsion does not flow through the perforations but water could be removed through the holes during the drying step. This film could be any combination of polymeric material or metal deposition with laminate with polymeric materials. An additional option would be to use a non-perforated film to encapsulate the emulsion during the polymerization step and perforate the film prior to the continuous web entering the drying operation.

One skilled in the art can identify many materials that can be employed as moving support layers. It is not intended that the aforementioned materials be an exhaustive list of possible moving support layers. Additionally, one can employ a combination of moving support layers such that, for example, one support layer becomes bound to the foam while another does not. One can orient the support layers such that the HIPE is deposited partially on a substrate intended to bind to the final foam and partially deposited on a moving support substrate not intended to be bound to the final foam, resulting in a HIPE foam with a substrate bound onto or into only a portion of the foam. In addition a substrate can be added to the top foam surface such that the final product is encapsulated between the substrates.

The lower support substrate can have sides preferably as high as the desired thickness of the HIPE foam extending on opposing edges and perpendicular to the lower support substrate between which the HIPE is deposited. The sides can act as a gasket against which an optional upper moving substrate positioned above the HIPE can be held thereby sealing the HIPE and preventing oil or aqueous vapors from escaping during polymerization. The sides can also be used to define the shape of the HIPE sheets regardless of whether they are used to seal the HIPE during polymerization. For example, the sides can be sinusoidal in the plane of the web and with one side out of phase with the side on the opposing edge such that the HIPE is deposited into a continuous sheet of repeating hour-glass shapes. Once polymerized, the sheet can be cut into individual hour-glass pieces for use in, for example, diapers.

After depositing the HIPE onto the lower moving support substrate the HIPE is leveled to the desired thickness above the lower moving support substrate. Leveling can be done by running the HIPE under a blade positioned at a fixed height above the lower moving support substrate. If a blade used to level the HIPE a head of HIPE is preferably maintained just prior to the blade in order to maintain a uniform HIPE thickness after the blade. In an optional application the blade used to level the HIPE can have a profile cut into it such that the HIPE develops a patterned, non-planar surface after traveling under the blade.

Alternatively, the HIPE can be leveled to a desired thickness by sandwiching between the lower moving support substrate and an upper moving substrate positioned at the fixed height above the lower moving support substrate. When using the upper moving substrate the HIPE is deposited onto the lower moving support substrate at a thickness greater than the height of the upper moving substrate so that a volume of HIPE is maintained prior to the upper moving substrate. Suitable materials for the upper moving substrate include those listed for the lower moving support substrate, though the two substrates need not be the same material. Optionally, both an upper moving substrate and a blade can be used.

The lower moving support substrate moves the HIPE into the heating zone where the HIPE is polymerized. Polymerization can be initiated prior to reaching the heating zone by, for example, preparing the HIPE at a temperature sufficient to begin polymerization. However, the HIPE is polymerized beyond the point of shapability or moldability in the heating zone. Heat for the heating zone can be, for example, derived from an oven located above and below the HIPE or surrounding the HIPE. Heat can be from forced air ovens, IR heat lamps, microwave, steam or other suitable source. In an alternative embodiment, the heat zone is actually a steam tunnel wherein the HIPE is exposed to steam thereby achieving highly efficient thermal transfer as water condenses onto the HIPE. It is readily apparent that such a steam tunnel configuration may be used in either the continuous process of the instant invention or in batch processes such as those disclosed in the prior art.

Optionally, the temperature may be elevated in a stepwise manner so as to increase the rate of polymerization and/or perhaps initiate drying as the HIPE becomes more completely polymerized. In addition, the curing of the HIPE may be accomplished by passing the web through a hot liquid bath composed of any hot liquid of sufficient temperature to initiate the curing of the oil phase. Polymerization temperatures will vary depending on the type of emulsion being cured, the initiator being used, heat source used, and whether or not the HIPE is sealed between the lower moving support substrate and the upper moving substrate using optional sides, but will typically be above 25° C., often above 50° C. Most often polymerization temperatures are between about 50° C. and 150° C. The HIPE is maintained in the heating zone for a time sufficient to polymerize at least 75%, preferably at least 90% of the monomers in the external phase of the HIPE. Sufficient polymerization of the HIPE is controlled by a combination of the initiator used, the temperature of the heat zone, the efficiency of the heat transfer in the heat zone, the rate at which the HIPE goes through the heat zone and the length of the heat zone.

The resulting polymerized emulsion ("foam") is saturated with internal phase, i.e., aqueous phase when using a water-in-oil HIPE, that needs to be removed to obtain a dry foam. Internal phase is removed from the foam by sending it through a drying zone where it is heated, exposed to a vacuum, or a combination of heated and exposed to a vacuum. Heat can be applied, for example, by running the foam though a forced air oven, IR oven, microwave oven or radiowave oven until. Vacuum can be applied, for example, by running the foam through a vacuum chamber or drawing a vacuum through one or both of a porous lower moving support substrate and upper moving substrate. One can envision many combinations of applying heat and vacuum to dry the foam. One can also envision a process where the heat zone and the drying zone are combined at least to some extent such that drying is allowed to occur during the polymerization process in the heating zone. The extent to which the foam is dried depends on the application. Typically, greater than 50% of the internal phase is removed. More often greater than 90%, even more often greater than 95% of the internal phase is removed during the drying process.

Optionally, foams can be squeezed free of most of the internal phase by running the foam through one or more pair of nip rollers towards the end or after exiting the heating zone. The nip rollers can be positions such that they squeeze the internal phase out of the foam. The nip rollers can be porous and have a vacuum applied from the inside such that they assist in drawing internal phase out of the foam. Alternatively, one roller of the pair can be pressurized while the other evacuated so as to both blow and draw the internal phase out the of the foam. The nip rollers may also be heated to help drive out the internal phase. Typically, the optional nip rollers are only applied to non-rigid foams, that is foams whose walls would not be destroyed by compressing the foam. In yet a further embodiment, the surface of the nip rollers may contain irregularities in the form of shapes such that a polymerized emulsion can be embossed as it is moving through the nip rollers.

Figure 2:
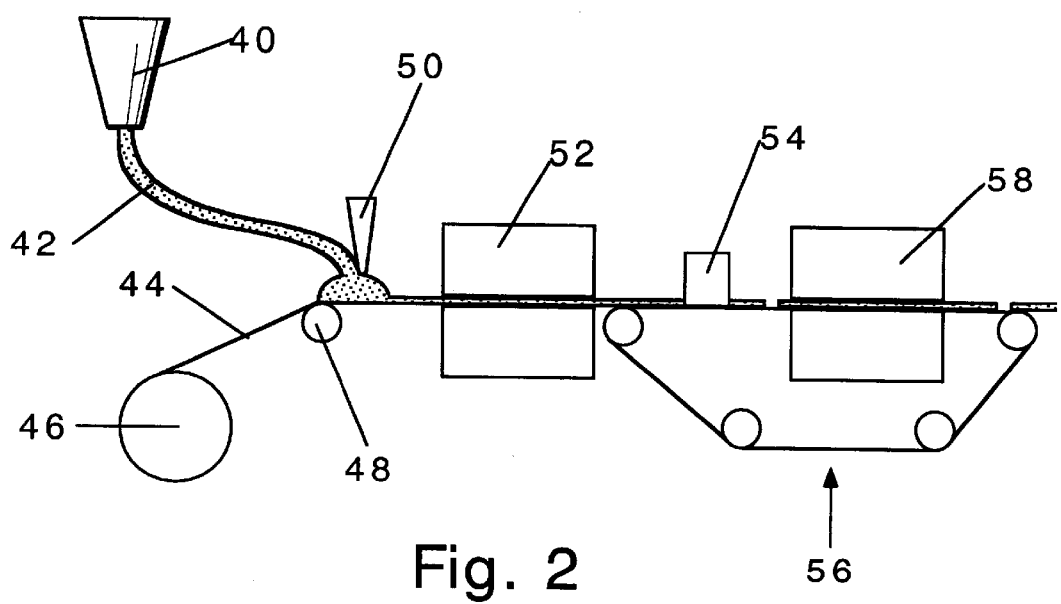
FIG. 2 is a schematic view of the invention comprising a lower moving support substrate that becomes bound to the foam, a blade to level the HIPE to a desired thickness, a steam tunnel for the heating zone, a shuttle knife to slice the polymerized HIPE into sections while on a conveyor belt, and an oven for the drying zone.

Another optional step is slicing the polymerized HIPE into sections and/or shaped articles prior to the drying zone. Slicing the HIPE increases surface area thereby allowing easier removal of the internal phase. Slicing can be done using a razor or knife that shuttles across the foam sheet at defined space intervals. Slicing can also be accomplished, for example, by using a roller with a razor edge patterned on its surface so that as the foam proceeds under the roller a repeated pattern is cut from the foam sheet. If the foam is sliced into section and/or shaped prior to the drying zone then at least one lower moving support substrate must not be sliced and must continue supporting and moving the foam through the heat zone. A lower moving support substrate can be introduced into the process just prior to slicing the HIPE, as indicated in FIG. 2.

One or more washing or rinsing steps may be included before and/or between drying zones. Washing steps may be included to remove residual extractable components in the foam or to incorporate components into the foam. For example, washing steps can be used to reduce the level of residual salt in the foam. Rinsing steps can be used to incorporate salt or surfactant into the foam to increase the foam's hydrophilicity. Washing and rinsing steps can be implemented in many ways while maintaining a continuous line. For example, the foam web can be squeezed between nip rollers prior to entering a bath of water, an aqueous solution (e.g., salt solution or surfactant solution), or solvent wherein the foam becomes resaturated with water, an aqueous solution (e.g., salt solution or surfactant solution), or solvent. The resaturated foam can then be dried as previously described or run through another wash/rinse bath.

After the drying zone, foam can be rolled into rollstock, sliced into boardstock, or cut into shaped articles. Slicing and cutting can be accomplished in a manner similar to that described for the optional slicing prior to the heat zone.

Conceivably, any or all steps of the process of this invention can oriented either vertically or horizontally with respect to the ground. For example, instead of laying down the HIPE onto a lower moving support substrate that runs horizontal to the ground the HIPE may be deposited onto an opening between a lower moving support substrate and an upper moving substrate both of which are running parallel to each other at a fixed distance apart yet running perpendicular to the ground, forming somewhat of a tower that is filled with HIPE. The HIPE and moving substrates could then either bend and run parallel to the ground or continue vertically though a heat zone to polymerize the HIPE.

Preferably, vapor and fluid released from the HIPE throughout the process is collected and recycled thereby eliminating the need to dispose of large volumes of internal phase, non-polymerized monomers, and any other extractable components. Collection of vapors can be accomplished by condensing vapors from the heat zone and drying zone. If nip rollers are implemented the fluid squeezed free from those nip rollers is also collected. The collected material is recycled into the HIPE emulsification process.

FIG. 1 is an illustration representing one manifestation of the invention including the output of a continuous or batch emulsifier (10) wherein the high internal phase emulsion (HIPE) is prepared. The HIPE is fed through a delivery tube (12) that is shuttled across a first lower moving support substrate (14), which is fed under the HIPE from a rollstock (16). The HIPE and first lower moving support substrate (14) travel on top of a second lower moving support substrate (18) consisting of a porous fiberglass conveyor belt. An upper moving substrate (20) in the form of a second porous fiberglass conveyor belt is positioned a fixed distance above the two lower moving support substrates (14, 18). The rate of HIPE deposition on the first lower moving support substrate (14) is such that a constant volume of HIPE is maintained before the upper moving substrate (20), thereby allowing the space between the upper moving substrate (20) and the lower moving support substrates (14, 18) to be filled with HIPE to a desired thickness. The substrates (14, 18, 20) move the HIPE through a forced air oven (22) which acts as the heating zone. Upon exiting the heating zone the HIPE, with the first lower moving support substrate (14) attached to it, travels into the drying zone. The first component in the drying zone is a pair of nip rollers (24) that squeeze out the majority of the internal phase. The second component in the drying zone is a forced air oven (26) through which the HIPE is transported. The dry foam is rolled into rollstock (28) by collecting the foam web on a mandrel (30).

FIG. 2 is an illustration representing one manifestation of the invention including the output of a continuous or batch emulsifier (40) wherein a high internal phase emulsion (HIPE) is prepared. The HIPE is fed through a delivery tube (42) that is shuttled back and forth across a lower moving support substrate (44), which is fed under the HIPE from a rollstock (46). The lower moving support substrate (44) travels over a roller (48) and then under a leveling blade (50) before which a volume of HIPE is maintained at a depth greater than the space between the blade (50) and the lower moving support substrate (44). The HIPE and lower moving support substrate (44) travel through a steam tunnel (52) that acts as the heating zone, polymerizing the HIPE such that the lower moving support substrate (44) becomes attached to the HIPE. After the steam tunnel (52) the HIPE moves on top of a conveyor belt (56) upon which the HIPE is sliced into boardstock by a blade (54) shuttling across the HIPE perpendicular to the direction the HIPE is traveling yet in the plane of the HIPE foam sheet. The resulting HIPE boards travel on the conveyor belt (56) through a forced air oven (58) which acts as the drying zone. The dry boardstock can be collected off from the conveyor belt after the oven and stacked for storage or delivery.

Figure 3:
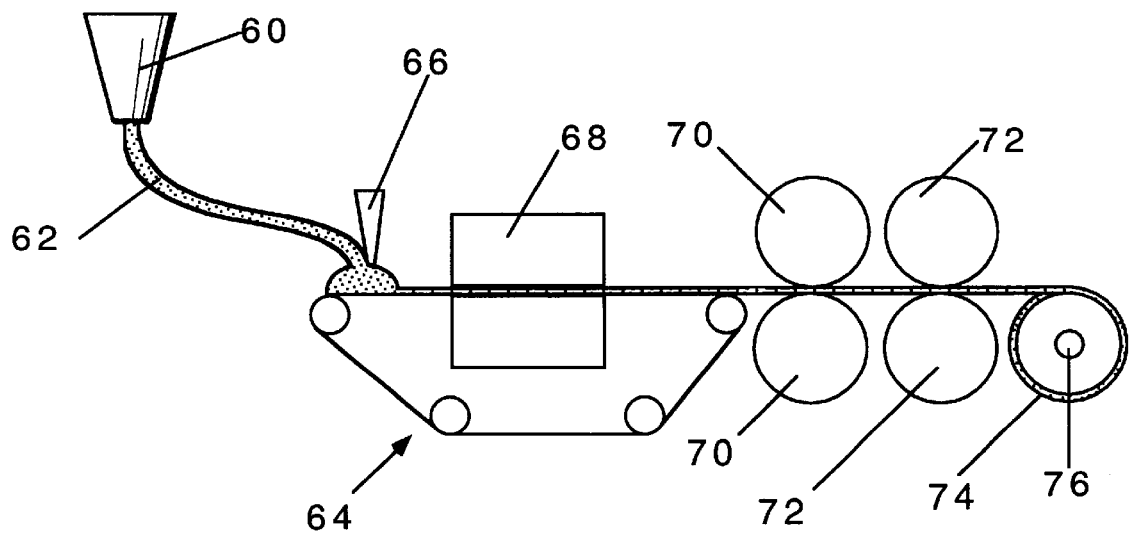
FIG. 3 is a schematic view of the invention comprising a lower support substrate, a leveling blade, an oven for the heating zone, nip rollers for the drying zone, and a mandrel onto which the dry foam is collected as rollstock.

FIG. 3 is an illustration representing one manifestation of the invention including the output of a continuous or batch emulsifier (60) wherein the high internal phase emulsion (HIPE) is prepared. The HIPE is fed through a delivery tube (62) that is shuttled back and forth across a porous Teflon-coated fiberglass conveyor belt which acts as a lower moving support substrate (64). A leveling blade (66) is positioned at a fixed height above the moving support substrate (64) and a volume of HIPE is maintained just prior to the leveling blade (66). The lower moving support substrate (64) moves the HIPE under the blade (66) and into the forced air oven (68) that acts as a heating zone. After exiting the heating zone the HIPE continues through heated porous nip rollers (70) which squeeze the majority of the internal phase out of the HIPE. A second set of porous nip rollers (72) apply a vacuum to the lower side of the foam and a pressure of hot air against the upper side of the foam. The two sets of nip rollers (70 and 72) make up the drying zone. The dried HIPE is collected as rollstock (74) by rolling it on a mandrel (76).

Figure 4:
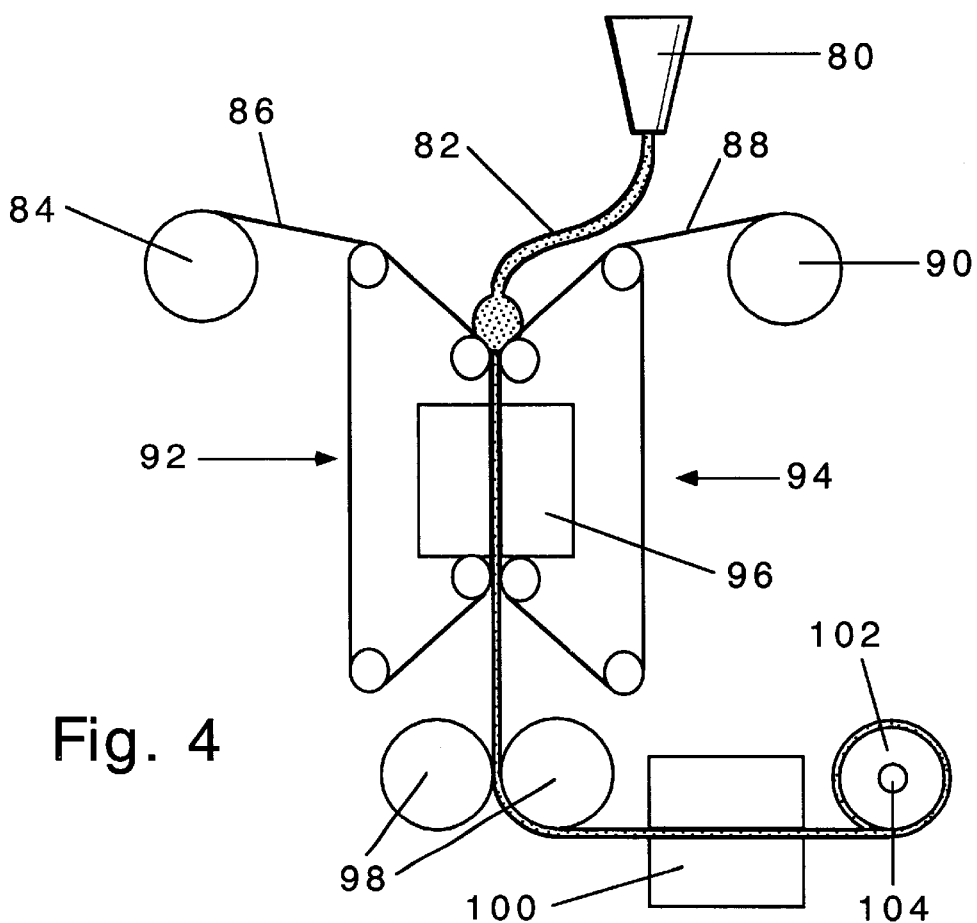
FIG. 4 is a side view of the invention comprising vertically oriented moving substrates comprising two lower moving support substrates, one of which becomes bound to the foam, and two moving upper substrates, one of which becomes bound to the foam; an oven for the heating zone; both nip rollers and an oven for the drying zone; and a mandrel onto which the dry foam is collected as rollstock.

FIG. 4 is an illustration representing one manifestation of the invention including the output of a continuous or batch emulsifier (80) wherein the high internal phase emulsion (HIPE) is prepared. The HIPE is fed through a delivery tube (82) that is shuttled back and forth across an opening between vertically positioned moving support substrates (86, 88, 92, 94) such that a reservoir of HIPE is maintained at the opening. The substrates in direct contact with the HIPE (86, 88) are polyester spunbond non-woven materials that will become attached to the either side of the HIPE sheet during polymerization. The spunbond substrates are supplied from rollstock (84) and (90). The remaining substrates (92, 94) are porous Teflon-coated fiberglass conveyor belts that run through a forced air oven (96) that acts as a heating zone. The HIPE travels through the forced air oven (96) between the conveyor belts (92, 94). After traveling through the forced air oven (96) the HIPE travels through nip rollers (98) that squeeze out a majority of the internal phase and then through a microwave oven (100). The nip rollers (98) and microwave oven (100) act as the drying zone in which the HIPE is dried to the desired degree. The final foam is collected as rollstock (102) around a mandrel (104).

What is claimed is:

1. A process for the continuous production of a polymerized high internal phase emulsion foam comprising:
   1) providing a high internal phase emulsion (HIPE) comprising:
      a) at least 70 percent by volume of an external phase comprising one or more polymerizable monomers;
      b) a surfactant in an amount effective to produce a high internal phase emulsion; and
      c) an internal phase
   2) depositing the emulsion onto a lower moving support substrate;
   3) leveling the emulsion to a desired thickness above the support substrate;
   4) polymerizing the monomers by running the emulsion and the lower moving support substrate through a heating zone for a time sufficient to polymerize at least 75% of the monomers in the HIPE by the end of the heating zone; and
   5) drying the polymerized HIPE in a drying zone for a time sufficient to produce a foam having greater than 50% of the internal phase removed.

2. The process of claim 1 wherein the external oil phase comprises vinyl polymerizable monomers.

3. The process of claim 2 wherein the internal water phase comprises water.

4. The process of claim 3 wherein the water phase comprises a water soluble monomer or polymer.

5. The process of claim 1 wherein the surfactant is a polymerizable surfactant.

6. The process of claim 1 wherein the emulsion is deposited on a lower moving support substrate through a tube that is shuttling back and forth across the lower moving support substrate, perpendicular to the direction the substrate is moving.

7. The process of claim 1 wherein the lower moving support substrate has a non-planar 3-dimensional structure to which the HIPE is molded.

8. The process of claim 7 wherein the 3-dimensional structure comprises embossed or depressed patterns.

9. The process of claim 8 wherein the 3-dimensional structure is one or more pattern chosen from the group consisting of an insignia, nipples, and logos.

10. The process of claim 1 wherein the lower moving support substrate is selected from the group consisting of plastic webbings and non-woven materials.

11. The process of claim 10 wherein the lower moving support substrate is selected from the group consisting of polypropylene, polyester, and polyethylene.

12. The process of claim 10 wherein the lower moving support substrate becomes attached to the polymerized HIPE during the polymerization process.

13. The process of claim 1 wherein the moving lower support substrate has sides on one or both edges standing perpendicular to the plane of the substrate between which the HIPE is leveled.

14. The process of claim 13 wherein one or both sides are not straight along the direction the lower moving support substrate is moving thereby defining a non-straight edge to one or both sides of the HIPE.

15. The process of claim 1 wherein the step of leveling is accomplished by a blade set at a fixed distance above the lower moving support substrate and positioned perpendicular to the direction the substrate is moving.

16. The process of claim 15 wherein the blade has a profile cut into it such that the profile is transferred to the surface of the HIPE as it travels under the blade.

17. The process of claim 1 wherein the step of leveling is accomplished by running the HIPE and the lower moving support substrate under an upper moving substrate set at a fixed distance perpendicular to and running parallel to the lower moving support substrate such that the HIPE is sandwiched between the upper moving substrate and lower moving support substrate.

18. The process of claim 17 further comprising running the HIPE and lower moving support substrate under a blade set at a fixed distance above the lower moving support substrate prior to the upper moving substrate.

19. The process of claim 17 wherein the upper moving substrate and lower moving support substrate are selected form the group consisting of plastic webbings and non-woven materials.

20. The process of claim 19 wherein the upper moving substrate and lower moving support substrate is selected from the group consisting of polypropylene, polyester, and polyethylene.

21. The process of claim 17 wherein one or both the upper moving substrate and the lower moving support substrate become attached to the polymerized HIPE during the polymerization process.

22. The process of claim 17 wherein the lower moving substrate has sides along the edges and perpendicular to the plane of the substrate and between which the HIPE is leveled and against which the upper moving substrate is pressed.

23. The process of claim 22 wherein one or both edges are not straight along the direction the lower moving support substrate is moving thereby defining a non-straight edge to one or both sides of the HIPE.

24. The process of claim 1 wherein at least 90% of the monomers in the external phase of the emulsion are polymerized by the end of the heating zone.

25. The process of claim 1 wherein the heat for the heat zone is provided by one or more energy source chosen from the group consisting of a forced air oven, an infrared oven, a microwave source, a radiowave source, and steam.

26. The process of claim 24 wherein the HIPE is heated by direct contact with steam.

27. The process of claim 1 wherein the heating occurs at a temperature above 25° C.

28. The process of claim 27 wherein the heating occurs at a temperature above 50° C.

29. The process of claim 28 wherein the heating occurs at a temperature between 50° C. and 150° C.

30. The process of claim 1 wherein the drying zone comprises one or more of the group consisting of nip rollers, forced air, infrared radiation, microwave radiation, radiowave radiation, and a vacuum.

31. The process of claim 30 wherein the nip rollers are selected from the group consisting of solid rollers and porous rollers.

32. The process of claim 31 wherein the nip rollers are heated.

33. The process of claim 31 wherein one or more of the nip rollers comprise a porous roller that draws a vacuum against the foam surface.

34. The process of claim 31 wherein one or more of the nip rollers comprise a porous roller that forces air against the foam surface.

35. The process of claim 31 wherein the nip rollers are in pairs with one member of the pair on the top of the foam and the other member on the bottom of the foam and wherein one member of the pair comprises a porous roller that draws a vacuum while the other member of the pair comprises a porous roller that forces air against the foam surface.

36. The process of claim 31 wherein the surface of one or more roller contains irregularities in the form of shapes such that a polymerized emulsion can be embossed as it is moving through the nip rollers.

37. The process of claim 30 wherein forced air is applied to one surface of the foam while a vacuum is applied to the opposing surface of the foam.

38. The process of claim 37 wherein the forced air is heated prior to application to the foam.

39. The process of claim 1 wherein greater than 90% of the internal phase is removed between the heating zone and the end of the drying zone.

40. The process of claim 1 wherein greater than 95% of the internal phase is removed between the heating zone and the end of the drying zone.

41. The process of claim 1 further comprising the step of washing the polymerized HIPE after polymerizing.

42. The process of claim 1 further comprising the step of rolling the foam onto a mandrel after drying.

43. The process of claim 1 further comprising the step of cutting the foam into set shapes after polymerizing.

44. The process of claim 43 wherein the step of cutting is accomplished using a roller with a design or pattern embossed on the surface with cutting edges such that as the roller rolls on the foam a pattern is cut into or out of the foam.

45. The process of claim 43 such that boardstock or articles are cut from the foam web prior to entering the drying zone.

46. A process for the continuous production of a polymerized high internal phase emulsion foam comprising:
1) providing a high internal phase emulsion (HIPE) comprising:
   b) at least 70 percent by volume of an external phase comprising one or more polymerizable monomers;
   d) a surfactant in an amount effective to produce a high internal phase emulsion; and
   e) an internal phase
2) depositing the emulsion between a lower moving support substrate and an upper moving substrate positioned opposite each other and moving parallel to each other, wherein the lower moving support substrate and the upper moving substrate are oriented perpendicular to the ground and move downwards towards the ground such that the HIPE fills the cavity between the two substrates and forms a column of HIPE;
3) leveling the emulsion to a desired thickness above the support substrate;
4) polymerizing the monomers by running the emulsion and the lower moving support substrate through a heating zone for a time sufficient to polymerize at least 75% of the monomers in the HIPE by the end of the heating zone; and
5) drying the polymerized HIPE in a drying zone for a time sufficient to produce a foam having greater than 50% of the internal phase removed.

47. The process of claim 46 wherein one or both the lower moving support substrate and the upper moving substrate have sides attached to their edges against which the sides of the opposing substrate of the opposing substrate itself is compressed.

48. The process of claim 1 further comprising the step of rinsing the polymerized HIPE after polymerizing.

* * * * *